Patented Jan. 12, 1937

2,067,291

UNITED STATES PATENT OFFICE 2,067,291

POLYAMINES AND PROCESS FOR MAKING THE SAME

Paul L. Salzberg, Wilmington, Del., assignor to E. I. du Pont de Nemours & Company, Wilmington, Del., a corporation of Delaware No Drawing. Application December 13, 1933, Serial No. 702,201

21 Claims. (Cl. 260—127)

This invention relates to polyamines and more particularly to di-(beta-phenylaminoethyl) amine and tri-(beta-phenylaminoethyl) amine.

This invention has as an object, the catalytic hydrogenation of aryl glycine nitriles. Another object is the catalytic hydrogenation of phenyl glycine nitrile. A still further object is the production of certain novel polyamines. A still further object is the production of phenyl ethylene diamine, di-(beta-phenylaminoethyl) amine, and a tertiary amine from phenyl glycine nitrile by catalytic hydrogenation. Other objects will appear hereinafter.

It has now been discovered that if phenyl glycine nitrile is heated either alone or with a suitable solvent and/or diluent in the presence of a hydrogenating catalyst and an excess of hydrogen at elevated temperature and pressure, hydrogenation of the phenyl glycine nitrile will take place with the production of certain novel polyamines.

The following examples, which describe preferred methods of carrying out this invention, are given by way of illustration only and are not to be construed as limiting the scope of this invention.

Example 1

135 grams of phenyl glycine nitrile dissolved in 200 cc. of 95% ethyl alcohol, together with 20 grams of nickel-on-kieselguhr catalyst was placed in a shaking autoclave. The autoclave was heated at 70° C. and a hydrogen pressure of 500 pounds per square inch for 3 hours, after which the temperature and pressure were increased to 100° C. and 900 pounds per square inch respectively and maintained for an additional 3 hours. The catalyst was separated from the reaction products by filtration, and washed with ethyl alcohol. Distillation of the reaction products gave (1) 42 grams of a fraction boiling at 140–145° C./12 mm., (2) 2 grams boiling at 150–260° C./12 mm., (3) 58 grams boiling at 260–268° C./12 mm. and 4 grams of residue. Fraction 1 was colorless and was found to be phenyl ethylene diamine and fraction 3 di-(beta-phenylaminoethyl) amine. Fraction 3 was almost colorless, but turned red on standing.

35 grams of phenyl ethylene diamine prepared as described above was dissolved in 200 cc. of ether, and hydrochloric acid gas was passed into the solution until it was saturated. The hydrochloride of the phenyl ethylene diamine precipitated and 43 grams of crude crystals were obtained. On recrystallization from absolute alcohol the hydrochloride separated in the form of white leaflets which melted at 202–203° C. to a dark red liquor. The crystals were very soluble in water and slightly soluble in ethyl alcohol.

51 grams of di-(beta-phenylaminoethyl) amine prepared as described above was dissolved in 200 cc. of absolute alcohol and 20 cc. of concentrated hydrochloric acid was slowly added to the solution. After adding 200 cc. more of absolute alcohol the solution was heated on a steam bath. On cooling and filtering a good yield of the hydrochloride of di-(beta-phenylaminoethyl) amine with obtained. Recrystallization from alcohol gave greyish white leaflets melting at 219–222° C. The crystals were soluble in hot water and hot alcohol and insoluble in the cold liquids.

Example 2

A high pressure reaction tube equipped for agitation with charged with 132 grams of phenyl glycine nitrile, 162 grams of 95% ethyl alcohol and 15 grams of nickel-on-kieselguhr catalyst. The reaction tube was heated at 70° C., and a hydrogen pressure of 1100 pounds per square inch for 1.5 hours, and additionally at 100° C. at the same pressure for 45 minutes. The catalyst was filtered off and washed with ethyl alcohol. Separation of the reaction products by fractional distillation gave: (1) 50 grams of a compound boiling at 142–145° C./12 mm., (2) 5 grams boiling at 150–260° C./12 mm., (3) 25 grams boiling at 262–265° C./12 mm., and 6 grams of residue. Colorless fraction 1 was identified as phenyl ethylene diamine, and fraction 3 was found to be di-(beta-phenylaminoethyl) amine, which turned red on standing.

Example 3

Using the same weights of material and catalyst as in Example 2, a run was made at 50° C. and 1500 pounds per square inch hydrogen pressure for 6.5 hours. As in Example 2 primary and secondary amines were produced and in addition, a white crystalline product melting at 130–138° C. was obtained by extracting the catalyst with acetone. The white crystals were basic and were found to be tri-(betaphenylaminoethyl) amine.

Example 4

A shaking autoclave was charged with 200 grams of dry crystalline phenyl glycine nitrile and 15 grams of nickel-on-kieselguhr catalyst. The reaction vessel was heated to 100° C. and a hydrogen pressure of 1200 pounds per square inch applied and maintained for 2 hours. Separation of the products was effected by distillation and 15 grams of phenyl ethylene diamine and 26 grams of di-(beta-phenylaminoethyl)amine were obtained, and identified by their boiling points. A residue of 73 grams was believed to be largely tri-(beta-phenylaminoethyl)amine.

*Example 5*

A solution of 100 grams of phenyl glycine nitrile in 125 grams of 95% ethyl alcohol together with 10 grams of nickel-on-kieselguhr catalyst was heated in a shaking autoclave at 100° C. and a hydrogen pressure of 1,600 pounds per square inch for 30 minutes. Hydrogen absorption was rapid. Upon recovery and separation of the products there was obtained: (1) 36 grams of a compound boiling at 106–109° C./2 mm., (2) 52 grams boiling at 225–230° C./2 mm., and (3) 14 grams with a melting point of 142° C. Analyses indicated fractions 1 and 2 to be respectively the primary and secondary amines of the previous examples and the analysis of fraction 3 corresponded to that for tri-(beta-phenylaminoethyl)amine.

The reaction of the present invention proceeds satisfactorily at relatively low temperatures and pressures. The preferred temperatures are in the range of 50 to 100° C., although higher temperatures up to 200° C., or even higher may be used. The preferred pressures are from 500 to 2,000 pounds per square inch but the only limit which need be placed on the pressure is the highest that the reaction vessel will withstand. The higher pressures and temperatures effect a more rapid hydrogen absorption. It has been found desirable to initiate the reaction at about 70° C. and 1,000 pounds per square inch pressure and after initial absorption has taken place to elevate the temperature to 100° C. to complete the reaction. This method gives a good yield of diamines.

While this invention has been described with reference to phenyl glycine nitrile, other aryl glycine nitriles may be used. Among these may be mentioned p-methyl-phenyl glycine nitrile, p-ethoxy-phenyl glycine nitrile and beta-naphthyl glycine nitrile.

It will be apparent from the examples that phenyl glycine nitrile may be hydrogenated alone or in the presence of a solvent. In general it will be found preferable to use a solvent such as ethyl alcohol. Other organic solvents that will not react with phenyl glycine nitrile or hydrogenated products or poison the catalyst may also be used. Among these may be mentioned dioxan and cyclohexane.

The preferred catalyst is nickel-on-kieselguhr. Nickel alone may be used but it is preferable to use a supporting agent, such as pumice, silica gel, kieselguhr, etc. Other metals may be used as catalysts instead of nickel, for example, any of the metals of the iron and platinum groups are suitable. The catalyst may also be admixed with activating agents such as the difficultly reducible oxides of metals such as vanadium, tungsten, chromium, etc.

By the process of this invention it is possible to obtain new polyamines by practical and economical methods. The products of the invention may be used in the manufacture of rubber accelerators, flex resisters, antioxidants, etc. Additionally the compounds are suitable for use as insect poisons.

It will be understood that many apparent and widely different embodiments of this invention may be made without departing from the spirit and scope thereof and therefore it is not intended to be limited except as indicated in the appended claims.

I claim:

1. The process which comprises hydrogenating an aryl glycine nitrile in the presence of a hydrogenating catalyst at a temperature of 50° to 200° C. and at a superatmospheric pressure.

2. The process of claim 1 characterized in that the compound being hydrogenated is phenyl glycine nitrile.

3. The process which comprises hydrogenating an aryl glycine nitrile in the presence of an excess of hydrogen and a nickel catalyst at a temperature of 50° to 200° C. and a pressure in excess of 500 pounds per square inch.

4. The process of claim 3 characterized in that the hydrogenation is carried out in the presence of an inert solvent for the reactants.

5. The process which comprises hydrogenating phenyl glycine nitrile in the presence of a nickel catalyst at a temperature of 50° to 200° C. and a pressure in excess of 500 pounds per square inch.

6. The process of claim 5 in which an excess of hydrogen is used.

7. The process of claim 5 characterized in that the catalyst is supported on kieselguhr.

8. The process of claim 5 characterized in that the nickel catalyst has associated with it a difficultly reducible hydrogenating metal oxide.

9. The process of claim 5 characterized in that the reaction is carried out in the presence of an inert solvent for the reactants.

10. The process of claim 5 characterized in that the reaction is initiated at about 70° C. and 1,000 pounds per square inch pressure and after initial absorption has taken place the temperature is raised to 100° C. to complete the reaction.

11. The process which comprises hydrogenating phenyl glycine nitrile in the presence of an excess of hydrogen and a nickel-on-kieselguhr catalyst at a temperature of 50–100° C. and a pressure of 500–2,000 pounds per square inch.

12. The mixture of amines produced by the catalytic hydrogenation of an aryl glycine nitrile.

13. The mixture of amines produced by the catalytic hydrogenation of phenyl glycine nitrile.

14. Di-(beta-phenylaminoethyl) amine.

15. Tri-(beta-phenylaminoethyl) amine.

16. The process of producing a diamine of the formula R—NH—CH$_2$—CH$_2$—NH$_2$, wherein R is a hydrocarbon group, which comprises hydrogenating the corresponding amino aceto nitrile under superatmospheric conditions of temperature and pressure in the presence of a hydrogenation catalyst.

17. The process of producing a diamine of the formula R—NH—CH$_2$—CH$_2$—NH$_2$, wherein R is an aryl group, which comprises hydrogenating the corresponding amino aceto nitrile at a pressure ranging from 90 to 140 atmospheres, at a temperature ranging from 100 to 150° C., and in the presence of a nickel-containing hydrogenation catalyst.

18. The process of producing a diamine of the formula R—NH—CH$_2$—CH$_2$—NH$_2$, wherein R is an aryl group, which comprises hydrogenating the corresponding amino aceto nitrile under superatmospheric conditions of temperature and pressure and in the presence of a hydrogenation catalyst.

19. The process of preparing phenyl ethylene diamine, which comprises hydrogenating phenyl amino aceto nitrile at a pressure ranging from 90 to 140 atmospheres, at a temperature ranging from 100° to 150° C., and in the presence of a nickel-containing hydrogenation catalyst.

20. The process which comprises hydrogenating an aryl glycine nitrile in the presence of a hydrogenating catalyst at superatmospheric temperatures and pressures.

21. The process of hydrogenating a phenyl glycine nitrile in the presence of a nickel catalyst at superatmospheric temperatures and pressures.

PAUL L. SALZBERG.

CERTIFICATE OF CORRECTION.

Patent No. 2,067,291.   January 12, 1937.

PAUL L. SALZBERG.

It is hereby certified that error appears in the printed specification of the above numbered patent requiring correction as follows: Page 1, first column, line 44, for "260-268°" read 265-268°; and that the said Letters Patent should be read with this correction therein that the same may conform to the record of the case in the Patent Office.

Signed and sealed this 16th day of March, A. D. 1937.

(Seal)

Henry Van Arsdale
Acting Commissioner of Patents.

19. The process of preparing phenyl ethylene diamine, which comprises hydrogenating phenyl amino aceto nitrile at a pressure ranging from 90 to 140 atmospheres, at a temperature ranging from 100° to 150° C., and in the presence of a nickel-containing hydrogenation catalyst.

20. The process which comprises hydrogenating an aryl glycine nitrile in the presence of a hydrogenating catalyst at superatmospheric temperatures and pressures.

21. The process of hydrogenating a phenyl glycine nitrile in the presence of a nickel catalyst at superatmospheric temperatures and pressures.

PAUL L. SALZBERG.

CERTIFICATE OF CORRECTION.

Patent No. 2,067,291.   January 12, 1937.

PAUL L. SALZBERG.

It is hereby certified that error appears in the printed specification of the above numbered patent requiring correction as follows: Page 1, first column, line 44, for "260-268°" read 265-268°; and that the said Letters Patent should be read with this correction therein that the same may conform to the record of the case in the Patent Office.

Signed and sealed this 16th day of March, A. D. 1937.

(Seal)

Henry Van Arsdale
Acting Commissioner of Patents.

CERTIFICATE OF CORRECTION.

Patent No. 2,067,291. January 12, 1937.

PAUL L. SALZBERG.

It is hereby certified that error appears in the printed specification of the above numbered patent requiring correction as follows: Page 1, first column, line 44, for "260-268°" read 265-268°; and that the said Letters Patent should be read with this correction therein that the same may conform to the record of the case in the Patent Office.

Signed and sealed this 16th day of March, A. D. 1937.

(Seal)

Henry Van Arsdale
Acting Commissioner of Patents.